3,152,306
CONTROL CIRCUIT FOR ASTABLE MULTIVIBRATOR
Benjamin Cooper, Waynesboro, and Lawrence J. Lane, Stuarts Draft, Va., assignors to General Electric Company, a corporation of New York
Filed June 20, 1960, Ser. No. 37,326
2 Claims. (Cl. 331—113)

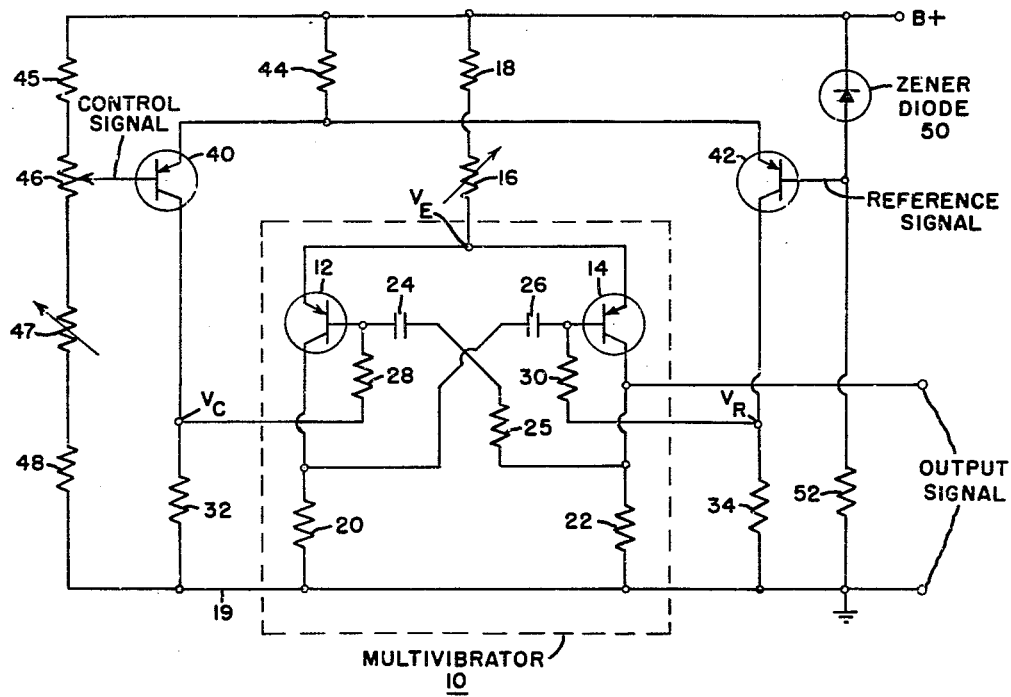
FIG.I.

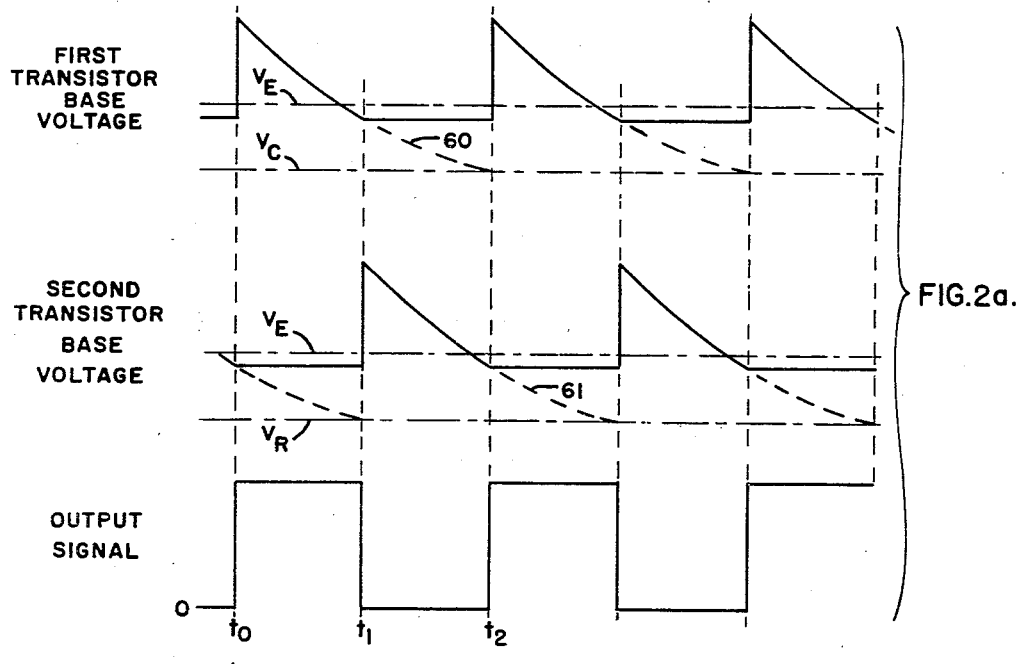
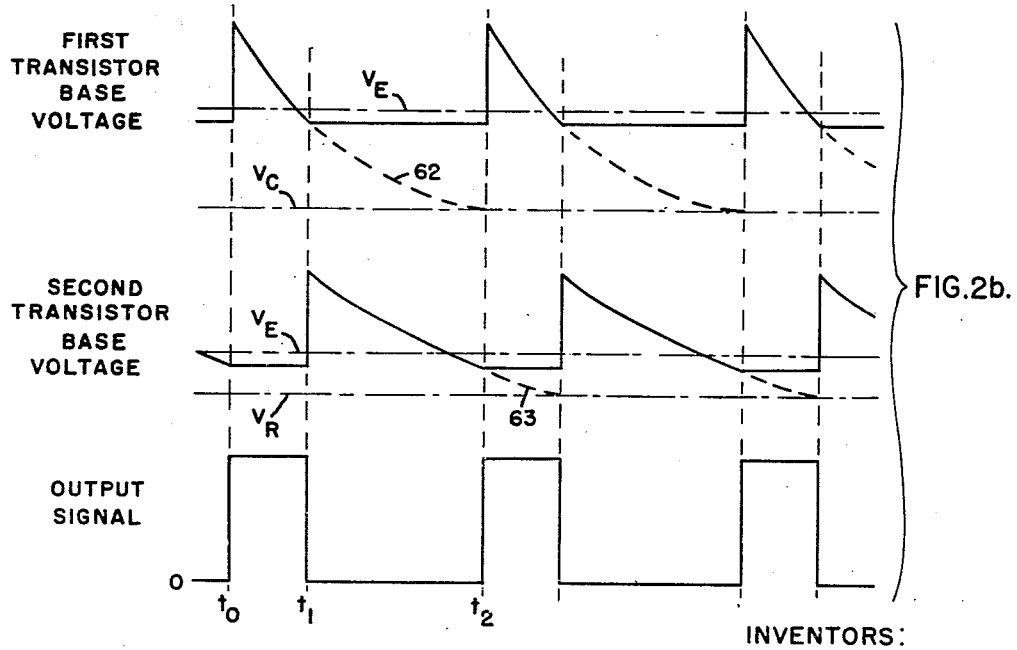

The invention relates to a control circuit and particularly to a control circuit for changing the relative periods of conduction of the active elements in a multivibrator circuit.

Multivibrator circuits utilizing transistors for the active elements are used in a number of applications. For example, a free-running or astable multivibrator circuit may be used to control the power supplied to a load, the amount of power supplied depending upon the relative periods of conduction of the active elements (transistors) of the multivibrator circuit. One known arrangement for varying the relative periods of conduction of the active elements includes means for increasing or decreasing the period of conduction of the active element which controls the power supplied to the load and, at the same time, permitting the period of conduction of the other active element to remain constant. While such an arrangement is satisfactory for some applications, other applications require that the total time of the relative periods of conduction of the active elements be constant despite changes in the relative periods of conduction themselves. Thus, these other applications may require that if the period of conduction of one element is increased a given amount, then the period of conduction of the other element must be decreased by the same given amount. In other words, these other applications may require that the total time interval or period, between the time when one element begins one type of transition and the time that the same element begins the succeeding same type of transition, be constant.

Accordingly, an object of the invention is to provide a control circuit which is capable of providing two signals which have equal magnitudes or which can be varied by equal and opposite amounts from the equal magnitudes.

Another object of the invention is to provide an improved control circuit which is capable of varying the period of conduction of one element of a multivibrator while keeping the total multivibrator period constant.

Another object of the invention is to provide an improved control circuit which is capable of increasing the period of conduction of one active element of a multivibrator while correspondingly decreasing the period of conduction of the other active element of a multivibrator.

Briefly, the control circuit of the invention comprises first and second transistors. The emitter-collector circuits of the two transistors are coupled to a source of potential with one corresponding end of each of the emitter-collector circuits coupled through separate impedances to one potential of said source and with the other ends of the emitter-collector circuits coupled together and coupled through a common impedance to another potential of said source. Means are coupled to the base of the first transistor for applying a control signal thereto and controlling the conduction of the first transistor. Means are coupled to the base of the second transistor for applying a fixed reference signal thereto. The one end of each of the two emitter-collector circuits may be coupled to respective active elements in a multivibrator circuit. With the other ends of the emitter-collector circuit coupled together and coupled to a common impedance, and with a reference signal applied to the base of the second transistor, the control signal applied to the base of the first transistor controls the conduction of the two emitter-collector circuits inversely so that if there is an increased conduction in one emitter-collector circuit, there is a corresponding decreased conduction in the other emitter-collector circuit. These increased and decreased conductions can be utilized to vary the relative periods of conduction of the active elements in a multivibrator circuit and permit the total multivibrator period to remain substantially constant.

The invention will be better understood from the following description taken in connection with the accompanying drawing and its scope will be pointed out in the claims. In the drawing:

FIGURE 1 shows a schematic diagram of a preferred embodiment of the invention as used with a multivibrator circuit; and FIGURES 2a and 2b show waveforms for the purpose of illustrating the operation of the schematic diagram shown in FIGURE 1.

The control circuit of the invention has been shown in FIGURE 1 as being with an astable or free-running multivibrator 10, but it is to be understood that the control circuit is in no way limited to such an application. The multivibrator 10 shown in FIGURE 1 is enclosed in dashed lines to distinguish it from the control circuit of the invention. The multivibrator 10 includes first and second PNP transistors 12, 14, each of which has an emitter, a base, and a collector. The emitters of the two transistors 12, 14 are coupled through a variable resistor 16 and a fixed resistor 18 to a source of unidirectional potential which is positive with respect to a reference potential bus 19 and which is designated by the legend B+. The collectors of the two transistors 12, 14 are coupled to a reference potential bus 19, which may be grounded, by respective first and second collector resistors 20, 22. The base of the first transistor 12 is regeneratively coupled to the collector of the second transistor 14 by a first timing capacitor 24 and a pulse sharpening resistor 25. The base of the second transistor 14 is regeneratively coupled to the collector of the first transistor 12 by a second timing capacitor 26. First and second coupling resistors 28, 30 are coupled to the respective bases of the first and second transistors 12, 14 to connect the multivibrator 10 to the control circuit of the invention. An output signal may be derived from the multivibrator 10 at any desired point, such as between the collector of the second transistor 14 and the reference bus 19.

When the multivibrator 10 is in operation, the transistors 12, 14 are alternately conducting and non-conducting. For purposes of explanation, assume that the first transistor 12 is conducting and that the second transistor 14 is non-conducting. During the time that the first transistor 12 is conducting, the first timing capacitor 24 is quickly charged as a result of current flowing from the emitter to the base of the first transistor 12, through the first timing capacitor 24, through the pulse sharpening resistor 25, and through the second collector resistor 22 to the reference bus 19. This charge makes the left-hand plate (i.e., the plate coupled to the base of the first transistor 12) of the first timing capacitor 24 positive with respect to the right-hand plate. At the same time that the first transistor 12 is conducting, the second transistor 14 is non-conducting because of the positive charge present on the right-hand plate (i.e., the plate coupled to the base of the second transistor 14) of the second timing capacitor 26. The second transistor 14 remains non-conducting until the second timing capacitor 26 loses some of its charge. The second timing capacitor 26 discharges by a current flow through the following path: Current flows from the source of potential B+ through the resistors 18, 16 through the emitter-collector circuit of the first transistor 12, through the second timing capacitor 26, through the second coupling resistor 30, and through a control circuit resistor 34 to the reference bus 19. When the potential on the right-hand plate of the second timing capacitor 26 falls to a value which is slightly negative with respect to the potential $V_E$ at the emitter of the second transistor 14, the second transistor 14 begins to conduct. When the second transistor 14 conducts, current in the second collector resistor 22 causes the collector to become positive and raise the entire potential of the first timing capacitor 24, including the positive potential on its left-hand plate and on the base of the first transistor 12. This raised positive potential causes the first transistor 12 to be cut off rapidly in typical multivibrator fashion. Thus, the multivibrator 10 is switched so that the second transistor 14 is conducting and the first transistor 12 is non-conducting. Under this condition the second timing capacitor 26 quickly charges and the first timing capacitor 24 discharges until the multivibrator 10 is switched again. The periods of non-conduction of the two transistors 12, 14 are determined in part by the size of the timing capacitors 24, 26 and the size of the resistors in the discharge path. The output signal may be derived from the collector of the second transistor 14 and the reference bus 19 as shown. The pulse sharpening resistor 25 provides a more vertical slope on the output signal when the second transistor 14 is cut off because the pulse sharpening resistor 25 provides some degree of isolation between the collector of the second transistor 14 and the first timing capacitor 24. The output signal may be utilized in a number of applications. For example, power may be supplied to a load circuit during the time that the second transistor 14 is in the non-conducting condition. The control circuit in accordance with the invention enables this period to be changed while, at the same time, maintaining the total period of the multivibrator 10 substantially constant.

The control circuit of the invention comprises third and fourth PNP transistors 40, 42 each having an emitter, a base, and a collector. The emitters of the third and fourth transistors 40, 42 are coupled together and coupled through an emitter resistor 44 to the source of unidirectional potential B+. The collectors of the transistors 40, 42 are coupled through the respective control resistors 32, 34 to the reference bus 19. The base of the third transistor 40 receives a control signal from the movable tap of a potentiometer 46 which is coupled in series with a suitable arangement of limiting and adjusting resistors 45, 47, 48 between the source of unidirectional potential B+ and the reference bus 19. Other circuitry can be utilized to provide a control signal. For example, a feedback circuit could be provided and coupled to a circuit which supplies power in response to the output signal. The feedback circuit could develop a feedback signal indicative of the relation between the power supplied and a reference signal. The feedback signal could be used as the control signal for the control circuit. The base of the fourth transistor 42 is coupled to a reference signal point which is provided with a potential that is negative with respect to the source of unidirectional potential B+ and which is positive with respect to the reference bus 19. This reference signal point may be provided as shown by means of a Zener diode 50 which has its cathode coupled to the source of unidirectional potential B+ and which has its anode coupled through a reference signal resistor 52 to the reference bus 19. The Zener diode 50 functions in the manner known in the art so that current flows from its cathode to its anode when the potential applied thereto exceeds a certain known value.

FIGURES 2a and 2b show waveforms, both along the same time axis, illustrating the operation of the control circuit in accordance with the invention as used with the multivibrator 10 shown in FIGURE 1. The waveforms in the two figures show the base voltages for the first and second transistors 12, 14, and the output signal. The figures also show the voltage at the emitters of the first and second multivibrator transistors 12, 14, designated $V_E$, the voltage at the collector of the third transistor 40, designated $V_C$, and the voltage at the collector of the fourth transistor 42, designated $V_R$. In the waveforms of FIGURE 2a, it has been assumed that the setting of the tap of the potentiometer 46 is such that the voltage $V_C$ at the collector of the third transistor 40 is equal to the voltage $V_R$ at the collector of the fourth transistor 42. Under these conditions, and at some time arbitrarily designated $t_0$, the second multivibrator transistor 14 begins conducting so that its collector voltage becomes positive thereby raising the base voltage of the first transistor 12 in a positive direction (because of the charge on the first timing capacitor 24) to a magnitude considerably greater than the emitter voltage $V_E$. The first transistor 12 is rendered non-conducting until the first timing capacitor 24 discharges sufficiently to permit the base voltage of the first transistor 12 to fall to a value sufficiently negative with respect to the emitter voltage $V_E$ so that the first transistor 12 begins conducting. As illustrated by the dashed line 60, the left-hand plate of the first timing capacitor 24 coupled to the base of the first transistor 12 tends to discharge toward the collector voltage $V_C$ of the third transistor 40. During this discharge interval, the second transistor 14 is conducting and the second timing capacitor 26 is receiving a charge as mentioned previously. At some time $t_1$ during this discharge interval the base voltage of the first transistor 12 becomes sufficiently negative with respect to the emitter voltage $V_E$ so that the first transistor 12 begins conducting. When the first transistor 12 begins conducting, its collector becomes positive thereby raising the base voltage of the second transistor 14 in a positive direction (because of the charge on the second timing capacitor 26) to a value considerably greater than the emitter voltage $V_E$. The second transistor 14 is then rendered non-conducting until the second timing capacitor 26 discharges sufficiently to permit the base voltage of the second transistor 14 to fall to a value sufficiently negative with respect to the emitter voltage $V_E$ so that the second transistor 14 begins conducting. As illustrated by the dashed line 61, the right-hand plate of the second timing capacitor 26 coupled to the base of the second transistor 14 tends to discharge toward the collector voltage $V_R$ of the fourth transistor 42. During this discharge interval, the first transistor 12 is conducting and the first timing capacitor 24 is receiving a charge as mentioned previously. At some time $t_2$ during this discharge interval the base voltage of the second transistor 14 becomes sufficiently negative with respect to the emitter voltage $V_E$ so that the second transistor 14 begins conducting. At this time, the cycle repeats itself in the same manner described as beginning at time $t_0$. It will thus be seen that the two transistors 12, 14 are conducting and non-conducting for equal time intervals, and produce the output signals shown in FIGURE 2a. The output signal shown has upper and lower magnitudes of equal time durations. That is, the time between $t_0$ and $t_1$ is equal to the time between $t_1$ and $t_2$. This result is brought about by similar circuit elements and by having equal collector voltages $V_C$ and $V_R$ towards which the timing capacitors 24, 26 may discharge. This output signal can be used to perform any desired function, such as to control power applied to a load during the interval between times $t_1$ and $t_2$.

If it is desired to increase the interval between the times $t_1$ and $t_2$ and, at the same time, decrease the interval between the times $t_0$ and $t_1$ so that the total period of the multivibrator (that is between times $t_0$ and $t_2$) remains substantially constant, this may be accomplished by the control circuit. In this case, the movable tap of the potentiometer 46 is moved towards the source of unidirectional potential B+ so that the base of the third transistor 40 is provided with a more positive potential. Under this condition, less current flows through the emitter-collector circuit of the third transistor 40 so that its collector voltage $V_C$ becomes less positive by a given amount. Less current in the emitter-collector circuit of the third transistor 40 also results in the emitter voltage of the third and fourth transistors 40, 42 becoming more positive. Since the base voltage of the fourth transistor 42 is fixed by the Zener diode 50, the more positive emitter voltage results in an increased emitter-collector current in the fourth transistor 42. Thus, the collector voltage $V_R$ of the fourth transistor 42 becomes more positive by substantially the same given amount. A less positive collector voltage $V_C$ of the third transistor 40 is illustrated in FIGURE 2b by the voltage $V_C$ which is further from the emitter voltage $V_E$, by some given magnitude, than it was in FIGURE 2a. Similarly, a more positive collector voltage $V_R$ of the fourth transistor 42 is illustrated in FIGURE 2b by the voltage $V_R$ which is closer to the emitter voltage $V_E$, by substantially the same given magnitude, than it was in FIGURE 2a. In other words, the voltage $V_C$ changes a given amount in one direction and the voltage $V_R$ changes the same given amount in the other direction. Expressed in still another way, when the difference between the voltages $V_E$ and $V_C$ is added to the difference between the voltages $V_E$ and $V_R$, the sum is always substantially constant. Under the new conditions, the circuit functions as previously explained. However, the first timing capacitor 24 now tends to discharge toward a less positive voltage $V_C$ along the dashed line 62 and the second timing capacitor 26 now tends to discharge toward a more positive voltage $V_R$ along the dashed line 63. This results in a decreased non-conducting period (between times $t_0$ and $t_1$) for the first transistor 12 and an increased non-conducting period (between times $t_1$ and $t_2$) for the second transistor 14. It is important to note however, that the total of the periods (that is from time $t_0$ to $t_2$) is substantially the same as for the operation explained in connection with FIGURE 2a. In FIGURE 2b, and at time $t_0$, the first multivibrator transistor 12 has just been rendered non-conducting so that the left-hand plate of the first timing capacitor 24 coupled to the base of the first transistor 12 tends to discharge toward a less positive voltage on the collector $V_C$. Since the voltage toward which the left-hand plate of the first timing capacitor 24 tends to discharge is less positive, the slope of the discharge voltage curve is steeper than it was in FIGURE 2a. Consequently, the base voltage of the first multivibrator transistor 12 falls below the emitter voltage $V_E$ at a sooner time, namely time $t_1$ as shown in FIGURE 2b. At time $t_1$ the first transistor 12 begins conducting and its collector voltage raises the base voltage of the second transistor 14 along with the charge on the second timing capacitor 26 so that the second transistor 14 is cut off. When the second transistor 14 is cut off, the right-hand plate of the second timing capacitor 26 coupled to the base of the second transistor 14 tends to discharge toward a more positive voltage $V_R$. Since the voltage toward which the right-hand plate tends to discharge is more positive, the slope of the voltage discharge curve is not as steep as it was in FIGURE 2a. Consequently, the base voltage of the second multivibrator transistor 14 falls below the emitter voltage $V_E$ at a later time. Hence, a greater interval of time (that is from $t_1$ to $t_2$) is required for the base of the second transistor 14 to reach the voltage needed to render the second transistor 14 conducting. However, the total multivibrator period, namely the interval between the time $t_0$ when one transistor begins a given transition and the time $t_2$ when the same one transistor begins the same transition again is maintained constant for both operations shown in FIGURES 2a and 2b.

While the operation for a control signal which is more negative than that shown in FIGURE 2a will not be explained, it is to be understood that if the movable tap of the potentiometer 46 is moved in the negative direction, the reverse of what has been explained will take place resulting in voltage $V_C$ being more positive than it was in FIGURE 2a and voltage $V_R$ being less positive than it was in FIGURE 2a. But even for this condition, the total multivibrator period is maintained substantially constant since the reference voltage $V_R$ is varied in an equal but opposite amount with respect to the variation of the control voltage $V_C$. Thus, it will be seen that the control circuit permits a single control signal to provide two signals which can have equal magnitudes or which can vary from the equal magnitudes by equal and opposite amounts. Such a circuit can be used to vary the relative periods of conduction of the active elements in a multivibrator while keeping the total multivibrator period substantially constant.

While the invention has been explained in connection with a particular embodiment and in a particular application, it is to be understood that modifications and other applications of the invention may be made by persons skilled in the art without departing from the spirit of the invention or from the scope of the claims.

What we claim as new and desire to secure by Letters Patent of the United States is:

1. A control circuit for controlling the relative periods of conduction of first and second transistors each having emitter, base, and collector electrodes regeneratively coupled in a multivibrator circuit having a source of energizing potential, said control circuit comprising third and fourth transistors each having emitter, base, and collector electrodes, means for coupling the emitter-collector circuits of said third and fourth transistors to a source of energizing potential with one end of each of said emitter-collector circuits coupled through separate and respective impedance elements to one potential of said source and with the other end of each said emitter-collector circuits coupled together and coupled through a common impedance element to another potential of said source, means coupled to said base of said third transistor for applying a signal thereto to control the conduction of said third transistor, means coupling said one end of said emitter-collector circuit of said third transistor to said base of said first transistor so that the current in said emitter-collector circuit of said third transistor controls the period of non-conduction of said first transistor, means coupled to said base of said fourth transistor for applying a substantially constant reference signal thereto, and means coupling said one end of said emitter-collector circuit of said fourth transistor to said base of said second transistor so that the current in said emitter-collector circuit of said fourth transistor controls the period of non-conduction of said second transistor.

2. A control circuit for controlling the relative periods of conduction and non-conduction of first and second transistors each having emitter, base, and collector electrodes which are regeneratively coupled by respective capacitor circuits coupled between each base of one transistor and the emitter-collector circuit of the other transistor in a multivibrator circuit that has a source of energizing potential, said control circuit comprising third and fourth transistors each having emitter, base, and collector electrodes, a source of energizing potential, a first resistor coupled between said collector electrode of said third transistor and one terminal of said source, a second resistor coupled between said collector of said fourth transistor and said one terminal of said source, means coupling said emitters of said third and fourth transistors together, a third resistor coupled between said emitter of said third and fourth transistors and another terminal of said source, means coupling said collector of said third transistor to said base of said first transistor, means coupling said collector of said fourth transistor to said base of said second transistor, means coupled to said base of said third transistor for applying a control signal thereto and controlling the current flow through said first resistor and thereby controlling the voltage applied to said base of said first transistor, means coupled to said base of said fourth transistor for applying a reference potential thereto and controlling the current flow through said second resistor and thereby controlling the voltage applied to said base of said second transistor, and means coupled to said multivibrator circuit for deriving an output signal therefrom.

References Cited in the file of this patent

UNITED STATES PATENTS

| | | |
|---|---|---|
| 2,540,478 | Frost | Feb. 6, 1951 |
| 2,757,282 | Exner | July 31, 1956 |
| 2,780,782 | Bright | Feb. 5, 1957 |
| 2,900,606 | Faulkner | Aug. 18, 1959 |
| 3,037,172 | Biard | May 29, 1962 |